Aug. 25, 1959     G. R. CARLSON     2,900,770
ROTARY WORK SUPPORTING AND INDEXING APPARATUS
Filed March 26, 1956     9 Sheets-Sheet 1
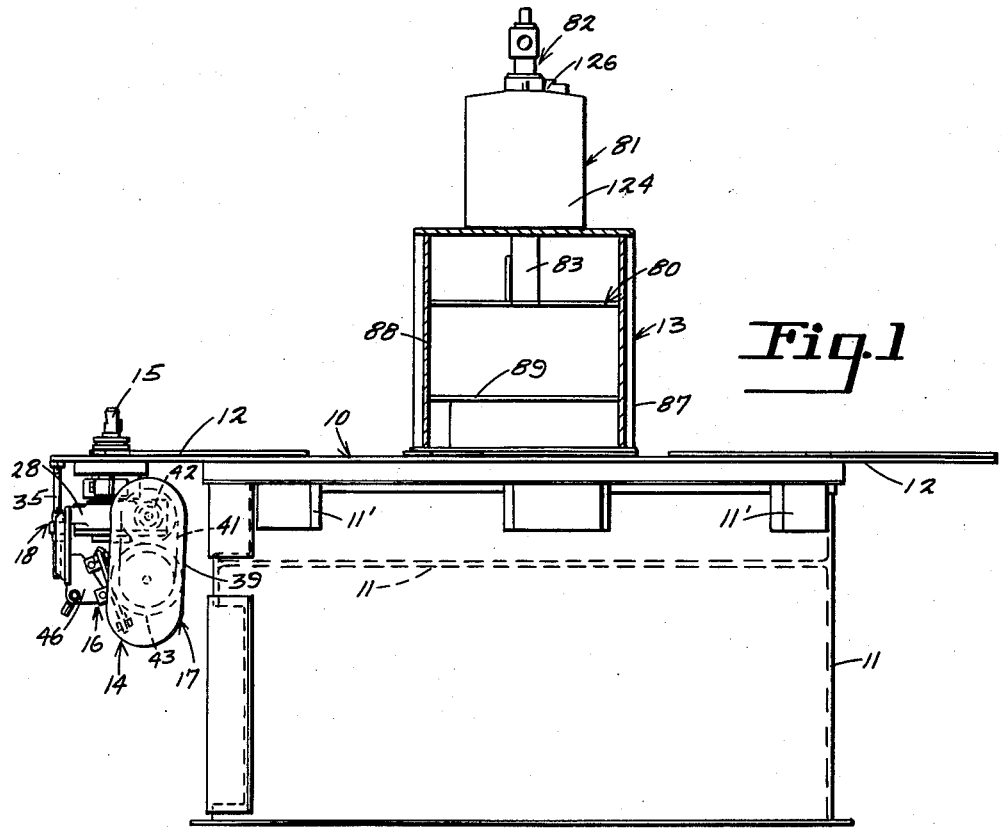
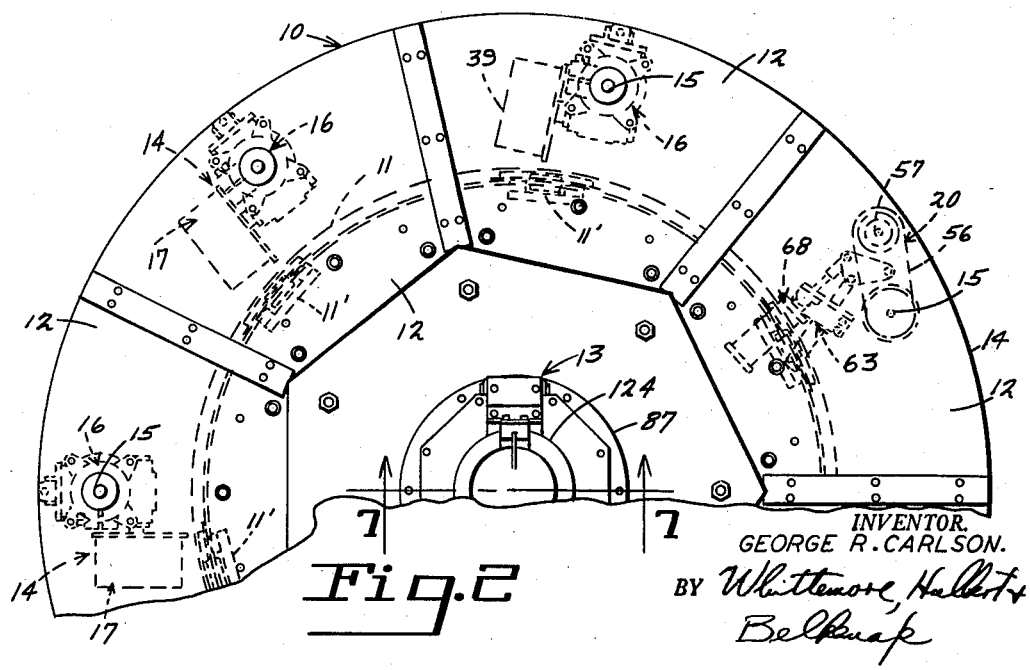
INVENTOR.
GEORGE R. CARLSON.
BY Whittemore, Hulbert & Belknap Aug. 25, 1959  G. R. CARLSON  2,900,770
ROTARY WORK SUPPORTING AND INDEXING APPARATUS
Filed March 26, 1956  9 Sheets-Sheet 2
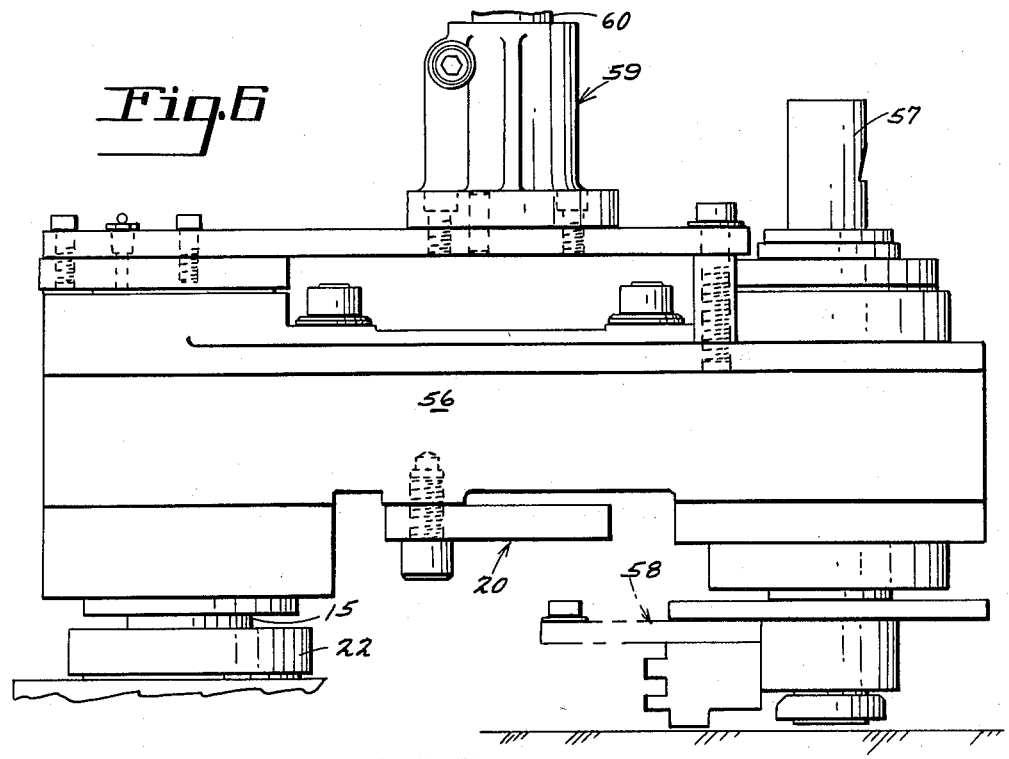
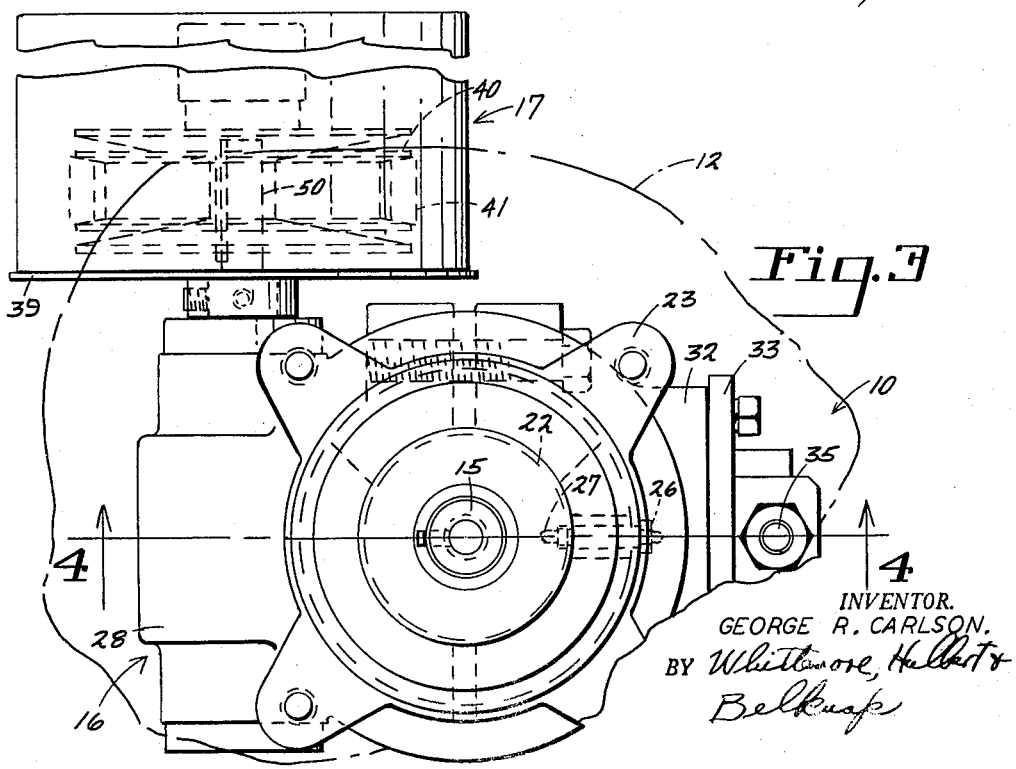
INVENTOR.
GEORGE R. CARLSON.
BY Whittemore, Hulbert &
Belknap

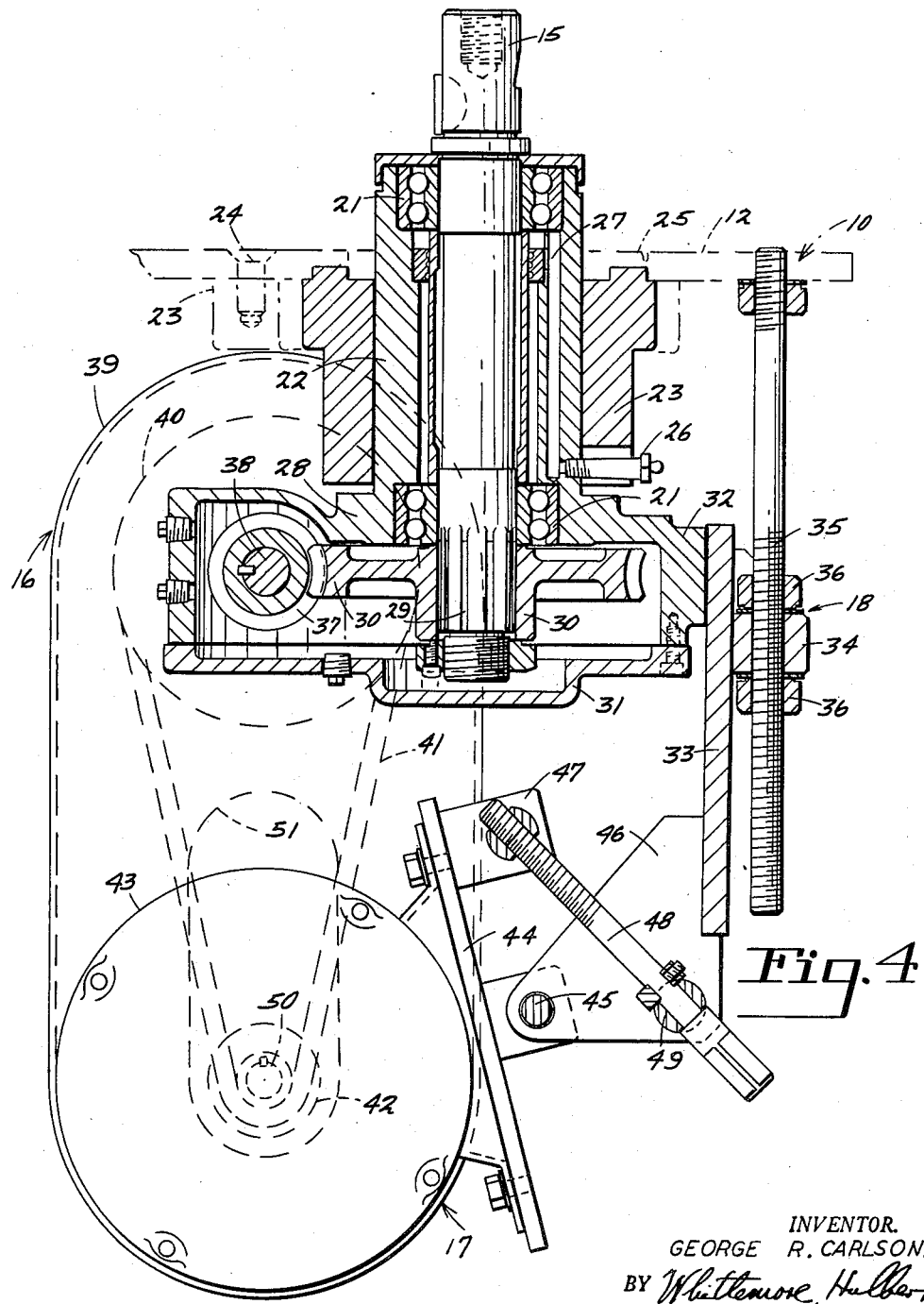

Aug. 25, 1959     G. R. CARLSON     2,900,770
ROTARY WORK SUPPORTING AND INDEXING APPARATUS
Filed March 26, 1956     9 Sheets—Sheet 4
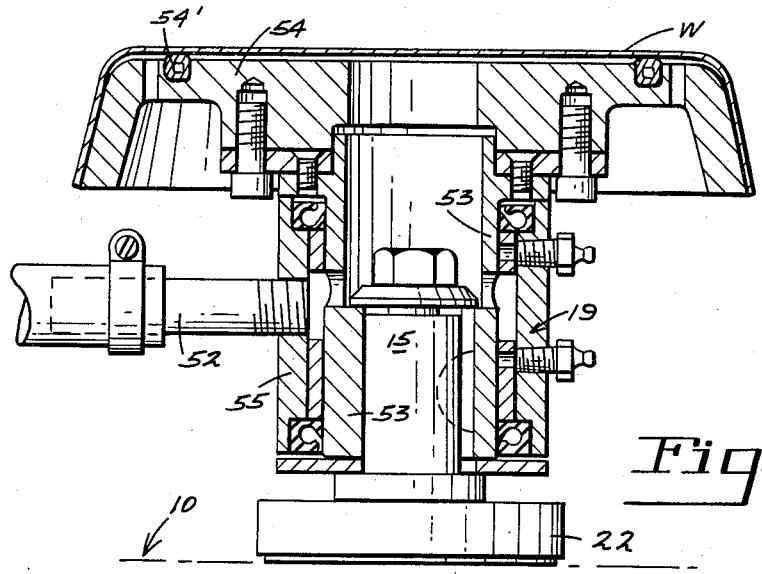
Fig.4A
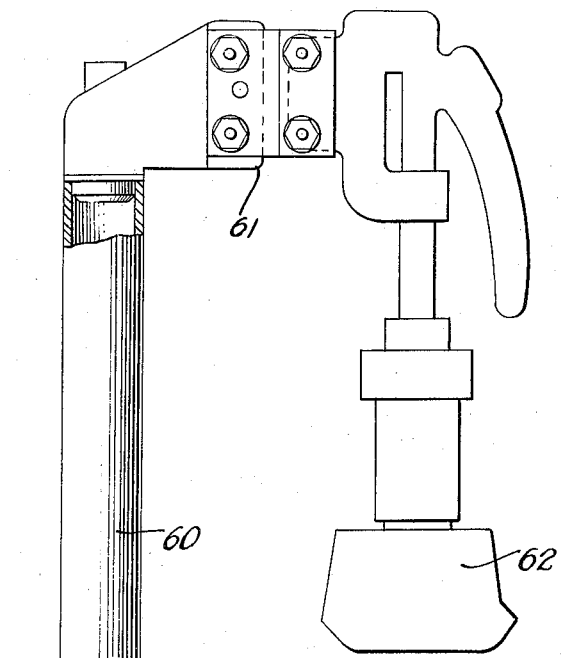
Fig.5A
INVENTOR.
GEORGE R. CARLSON
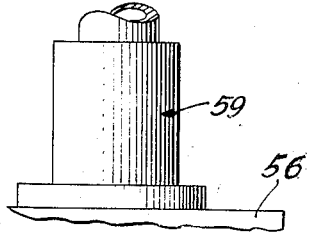

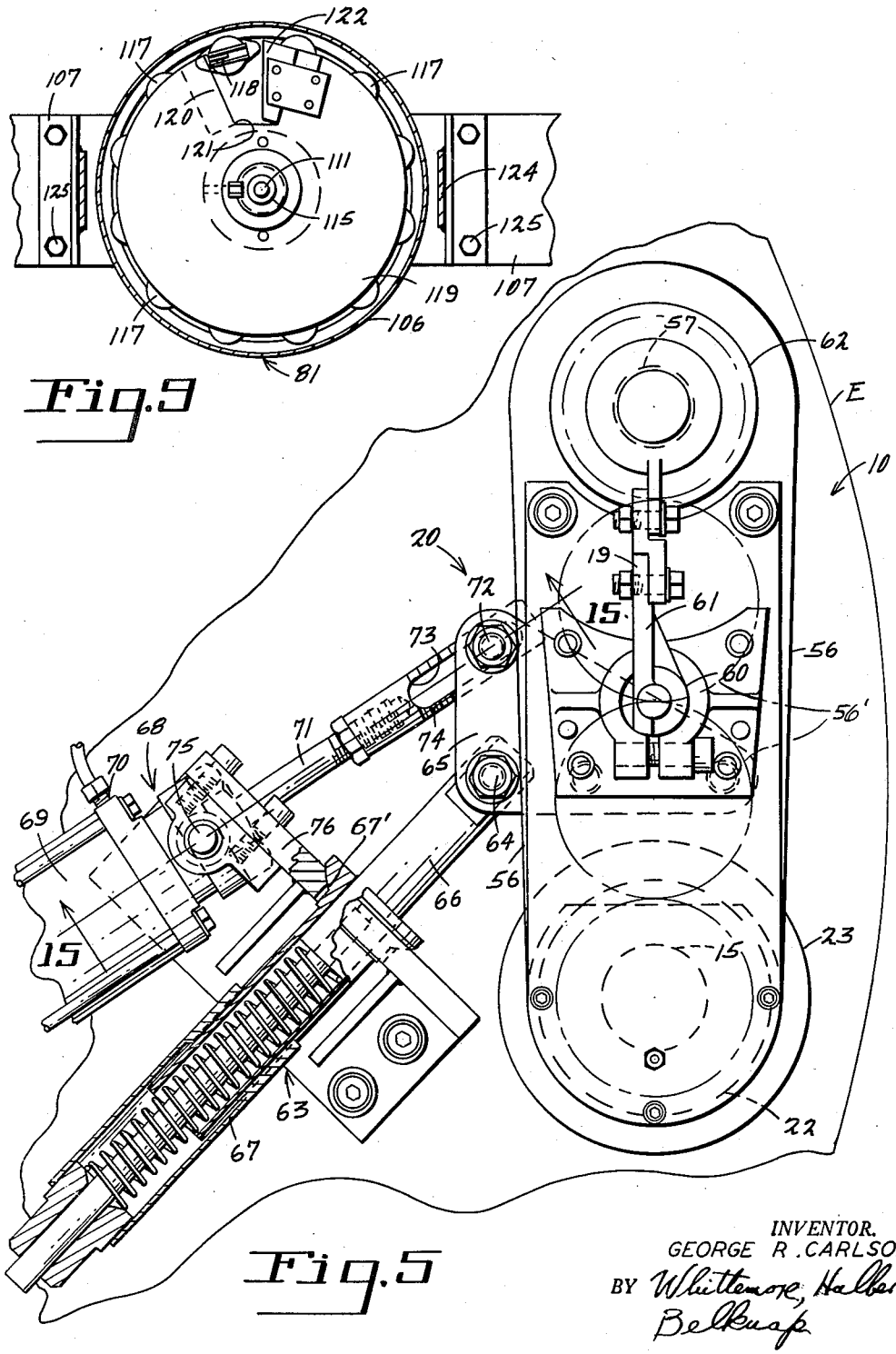

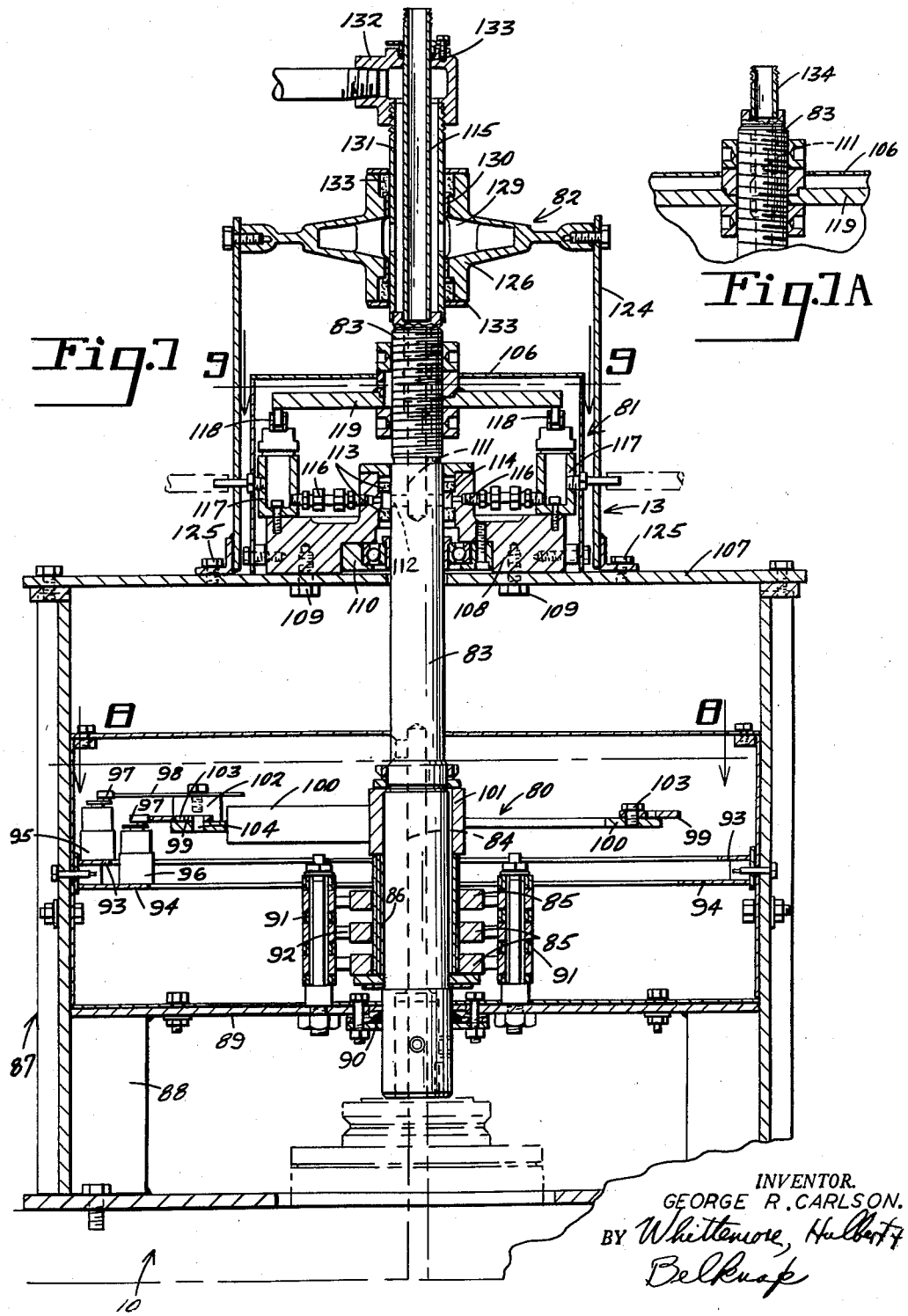

Aug. 25, 1959 G. R. CARLSON 2,900,770
ROTARY WORK SUPPORTING AND INDEXING APPARATUS
Filed March 26, 1956 9 Sheets-Sheet 7

INVENTOR.
GEORGE R. CARLSON.
BY

Aug. 25, 1959 G. R. CARLSON 2,900,770
ROTARY WORK SUPPORTING AND INDEXING APPARATUS
Filed March 26, 1956 9 Sheets-Sheet 8
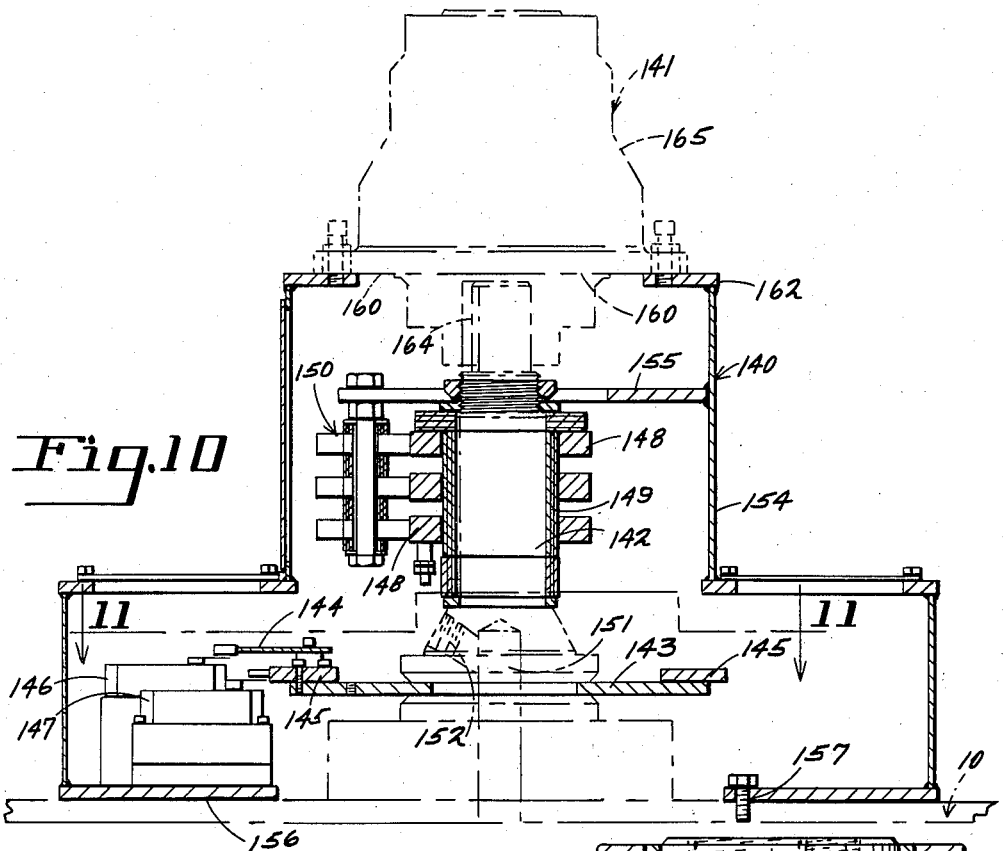
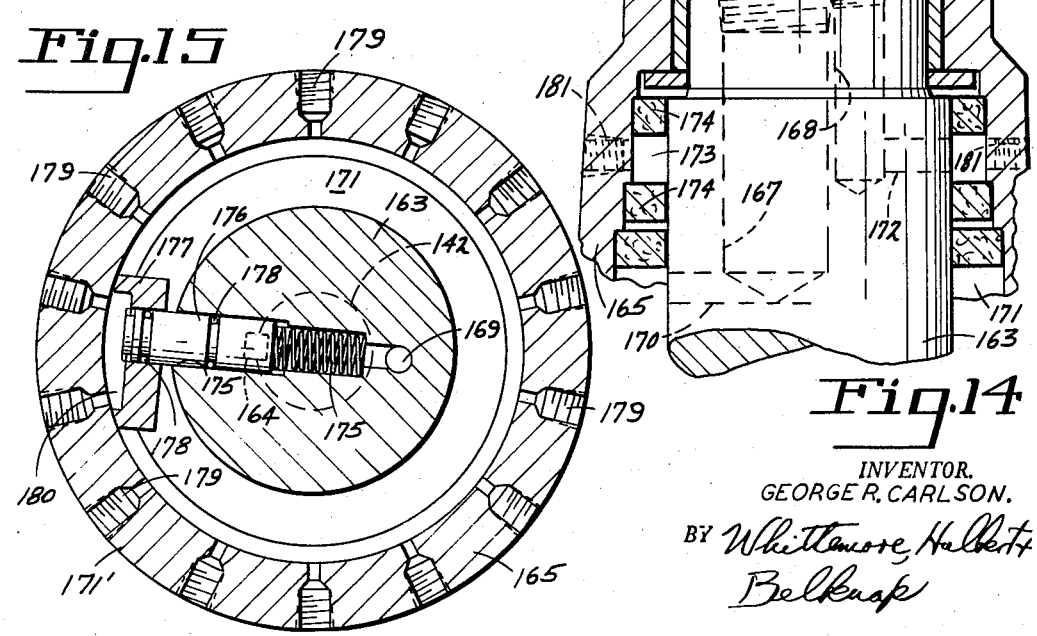
INVENTOR.
GEORGE R. CARLSON.

Aug. 25, 1959     G. R. CARLSON     2,900,770
ROTARY WORK SUPPORTING AND INDEXING APPARATUS
Filed March 26, 1956     9 Sheets-Sheet 9

INVENTOR.
GEORGE R. CARLSON.
BY Whittemore, Hulbert & Belknap

United States Patent Office 2,900,770
Patented Aug. 25, 1959

2,900,770

ROTARY WORK SUPPORTING AND INDEXING APPARATUS

George R. Carlson, Birmingham, Mich.

Application March 26, 1956, Serial No. 573,747

23 Claims. (Cl. 51—237)

The present invention relates to improvements in a rotatively traveling work indexing apparatus by which a plurality of articles to be successively operated on, as by buffing wheels arranged at the successive operating stations of an industrial polishing machine, are successively presented to these wheels, are individually rotated as the buffing operations are performed, and are thereupon rotatively indexed to a next operating station.

The invention more particularly concerns an improved rotatively travelling horizontal table, or indexing support proper, about which a plurality of individual spindles are mounted in circumferentially spaced relation to one another, each for rotation about its own axis, each spindle being powered by its own electric motor for such individual rotation. Control of current for the motors, as well as the control of fluid pressure also employed in the operation of work holders associated with the spindles, is effected by a common control unit which rotates with the table or work support.

It is a general object of the invention to provide an improved work supporting and conveying apparatus of this type by which work articles supported and conveyed may either be given a simple rotative movement about the spindle axis, or by which the spindle may also be given a bodily shifting movement, in phases of pause as the articles are transported step by step past a series of polishing or related units. For example, it is contemplated that a vacuum type chuck may be mounted on each spindle, and the control of vacuum in the operation of such chuck will be furnished by the common control unit, referred to above, which governs electrical circuitry of the spindle drive motors.

Alternatively, it may be desirable that the work be given an oscillatory movement to enable it to clear a buffing wheel in the pause between indexing movements. In such event, it is contemplated that oscillatory adapter units will be applied to the usual spindles of the apparatus, each adapter unit being appropriately connected, as by a gear train, to one of the motor driven spindles and having its own driven auxiliary spindle which may receive a vacuum type work holder or chuck of the character referred to above. In an installation of this character, the bodily oscillation of the adapter unit will be controlled automatically in the rotation of the indexing table, as will the making and breaking of vacuum for the auxiliary chuck.

In accordance with the illustrated form of the invention, the spindle driving provisions may include a driving connection from a motor to its associated spindle through a variable speed reduction, which greatly increases the range of utility of the apparatus. However, in any installation, according to the invention, the common control unit mentioned above, will include suitable commutation and current switching provisions operating automatically at the commencement and end of a complete table indexing cycle to halt each spindle drive motor and spindle, so that a finished article of work may be removed from a work holder or chuck on the spindle.

In accordance with a further refinement of the invention, the upright, individually driven work spindles transported by the indexing table or work support proper include means to adjust the spindle and its individual driving unit in the vertical direction, thus to accommodate the spindle to the different types of work supporting or actuating function which the spindle is to perform from time to time.

In reference to the common control unit for the electrically and fluid power controlled instrumentalities conveyed by the table, it preferably includes one or more distributor sections traveling rotatively with the table in a horizontal plane and a relatively fixed supply member on the axis of such rotation. The fixed member is in the form of a hollow upright post or stem connected to suitable sources of fluid pressure, negative and/or positive, and also supports electrically supplied slip rings. The rotating distributor device has sliding fluid distributing and current commutating engagement with this fixed supply member or post, and cam controlled means periodically operated in the relative rotation of the distributor and fixed supply member govern the periodic distribution of fluid pressure and electrical current to the operating instrumentalities on the table. Thus, the spindle driving motors, the spindle vacuum chucks or other work holders, oscillatory means for the latter, and the like, may be periodically timed as to actuation and de-actuation in an entirely automatic fashion during the intermittent travel of the work table about its own axis.

The foregoing as well as other objects of the invention will become more apparent as this description proceeds especially in connection with the accompanying drawings, in which:

Fig. 1 is a view in side elevation, partially sectioned axially, generally illustrating the improved apparatus;

Fig. 2 is a fragmentary plan view of the apparatus of Fig. 1;

Fig. 3 is a top plan view of one of the several individual, angularly spaced spindle drive units carried by the indexing table of the apparatus of Figs. 1 and 2;

Fig. 4 is a view in section along line 4—4 of Fig. 3, showing internal details of the drive unit of that figure;

Fig. 4A is a view in vertical section through a vacuum type work holding chuck contemplated for use on the improved apparatus;

Fig. 5 is a plan view, partially broken away and in horizontal section, of an auxiliary oscillator unit or adapter mechanism which may be employed in certain installations of the improved apparatus;

Fig. 5A is an elevational view of an auxiliary chuck device with which the apparatus may be equipped for certain operations;

Fig. 6 is a fragmentary view in side elevation of the adapter of Fig. 5, certain control instrumentalities for this unit being indicated in dot-dash line;

Fig. 7 is a sectional view in somewhat enlarged scale of a common electrical and fluid pressure control and distribution unit of the apparatus, being in vertical section along a line corresponding generally to line 7—7 of Fig. 2;

Fig. 7A is a fragmentary view in section similar to Fig. 7 of a modified type of vacuum adapter connection which may be employed in lieu of that shown in Fig. 7 in the event certain pneumatic pressure supply provisions in the latter are omitted;

Figure 8:
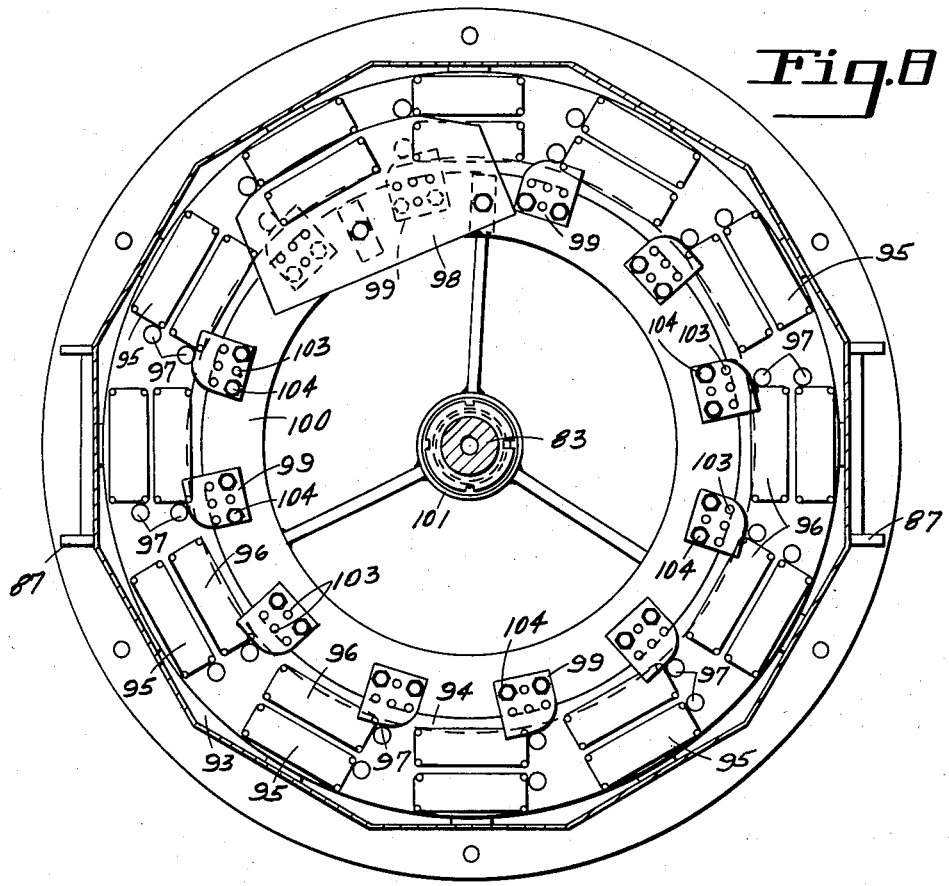
Figure 11:
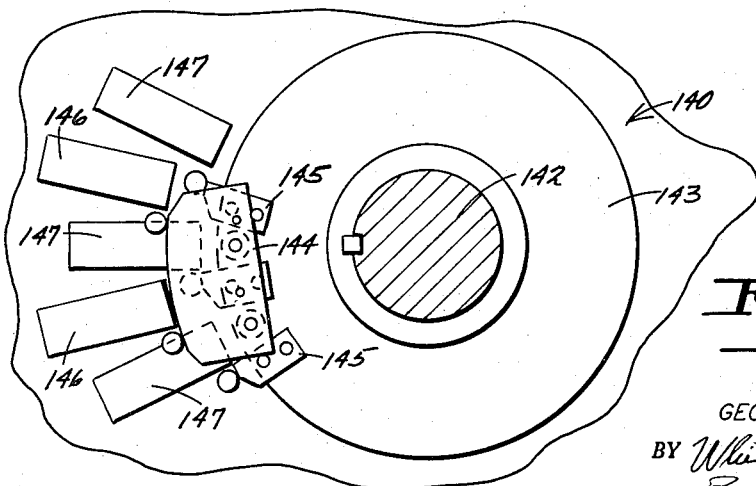
Figure 12:
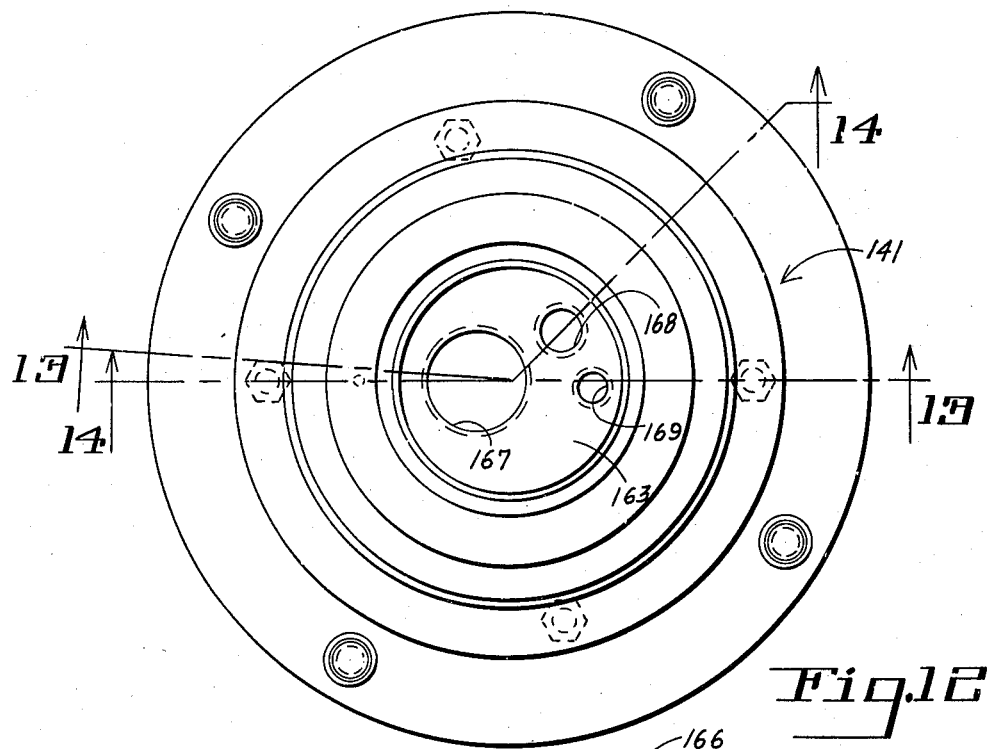
Figure 13:
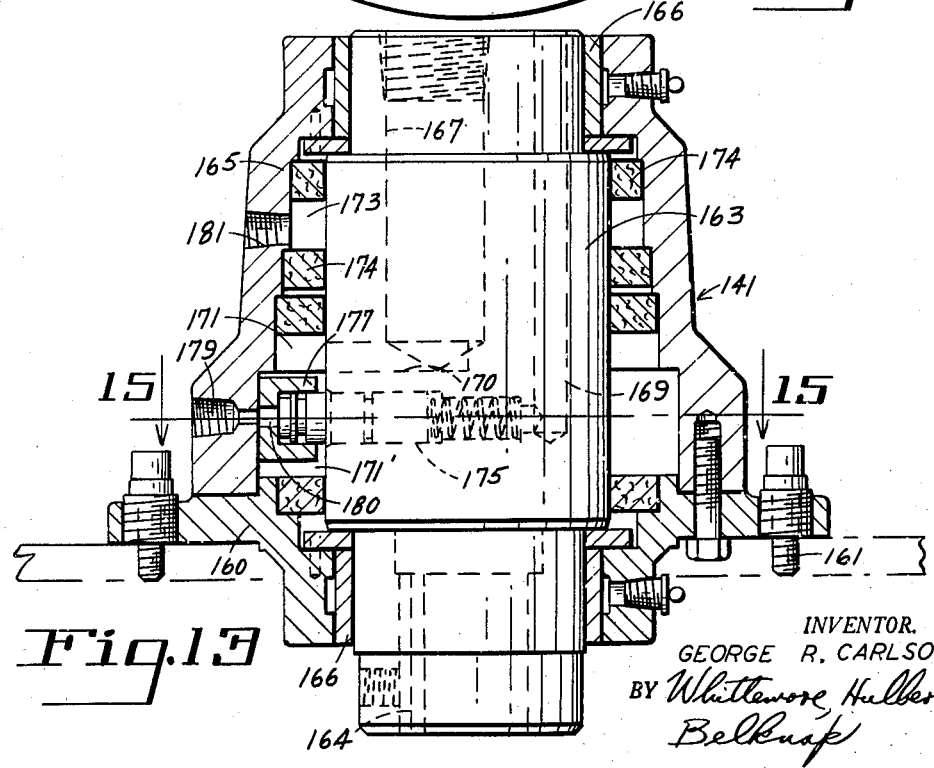

Figs. 8 and 9 are, respectively, views in horizontal section along lines 8—8 and 9—9 of Fig. 7;

Fig. 10 is a view illustrating an alternative form of common control unit which may be substituted for that illustrated in Fig. 7, being in the main in vertical axial section;

Fig. 11 is a view in horizontal section along line 11—11 of Fig. 10, showing electrical switch control provisions;

Fig. 12 is a top plan view, in somewhat enlarged scale, of the common control unit of Fig. 10;

Figs. 13 and 14 are, respectively, views in vertical section along the lines 13—13 and 14—14 of Fig. 12; and Fig. 15 is a view in horizontal section along line 15—15 of Fig. 13.

First referring to Figs. 1 and 2 of the drawings for a showing of the general assembly of the improved apparatus, the same comprises a work table or support 10 which is caused to travel rotatively in a horizontal plane. The travel is preferably an intermittent, step-by-step motion, as imparted by means of an appropriately powered Geneva-type drive (not shown) between a prime mover and table 10. Table 10 is strongly supported on and journalled by a rugged base or frame work 11, and as to this mount, appropriate bearings 11' may be used. Table 10, as preferably constituted, is subdivided into a number of rigidly connected and braced arcuate sections 12. The number of these sections may be varied to suit the buffing or related equipment (not shown) with which the apparatus is associated, as well as in accordance with the intended output of the installation. Further conventional details regarding structural features of the indexing table, its supporting structure and its driving provisions are neither illustrated nor described.

The essential instrumentalities associated with indexing table or support 10 are a common electrical power and fluid pressure control and distribution unit 13, in part fixed and in part rotating with the table, and a series of individually driven work spindle units or assemblies 14 carried by table 10 in equal circumferential spacing about the axis of rotation of the table.

Each of the assemblies 14 consists of an upright, positively driven spindle 15 for a chuck or work holder (of the type shown in Fig. 4A, or adapted to have an auxiliary work holder operatively associated therewith), an adjustable, individual electrical driving motor unit 16 for the spindle, a suitable variable speed drive connection 17 from the motor of the unit to the spindle, and an adjustable support structure 18 by which each spindle, motor and drive unit is sustained by one of the table sections 12, in centered relation to the latter and adjacent its outer arcuate edge.

Each spindle 15 is adapted, in accordance with the particular type of buffing or related operation to be performed on work articles transported by table 10, to have associated therewith and direct driven thereby either a vacuum type work holding chuck 19 (such as is illustrated in Fig. 4A and will later be described), or alternatively, an auxiliary arm 20 of an oscillatory type, housing a gear train to drive an auxiliary spindle (to be hereinafter described and as illustrated in Figs. 5 and 6, as well as in dot-dash line in Fig. 2), may be applied to spindle 15. These work holding devices, as variously applied to spindle 15, are controlledly operated by fluid pressure, positive and/or negative, under the regulation of the common distributor unit 13 of the apparatus. Unit 13 functions to the same end as a common electrical control for all of the electrically driven assemblies 14 carried by indexing table 10. The structural features of the unit 13 will be described after an explanation of the construction and operation of one of these assemblies.

As illustrated in Figs. 3, 4 and 4A, each of the spindles 15 projects substantially above the upper surface of indexing table 10, or of one of its component segments 12, being rotatively mounted by upper and lower ball bearings 21 in a vertically elongated sleeve 22 carried by table 10. The sleeve 22 is received for sliding vertical adjustment in a flanged mounting ring or collar 23 which is rigidly secured to the under surface of table segment 12, as by countersunk screws 24 tapped into an extension of the collar. The spindle journalling structures thus described are received in suitable apertures 25 in the table, and appropriate provisions are preferably made to tighten the collar in rigid clamping relation to sleeve 22 in any vertically adjusted position of the latter. The upper spindle bearing 21 may be lubricated through a suitable lubricant fitting 26 tapped into the lower end of a passage 27 extending upwardly in sleeve 22.

The sliding sleeve 22 is preferably connected integrally on its lower end with a worm and gear housing 28, into which a splined lower extremity 29 of spindle 15 extends to receive the worm wheel 30. The housing 28 is removably closed at its lower end by a cover plate 31 and has a side boss 32 to which is rigidly connected a depending bracket plate 33 carrying a vertically tapped side lug 34. Lug 34 adjustably receives a supporting rod 35, which rod depends in fixedly supported relation from a segment 12 of indexing table 10. Lock nuts 36 above and below the tapped lug 34 coact with rod 35 in holding the bracket plate 33 and gear housing 32 in any desired vertical adjustment, thus determining the vertical position of sleeve 22 and spindle 15 relative to the table 10.

A worm 37 in driving engagement with worm wheel 30 is secured on a variable speed output shaft 38 which extends into housing 28. Shaft 38 extends into a further housing or casing 39 at one end of gear housing 28, and the housing 39 encases a conventional adjustable belt pulley 40 of the variable speed drive connection or device 17, which may be of the adjustable cone pulley and belt type, as shown in Fig. 3. Within casing 39 a drive belt 41 passes about the pulley 40 and about a lower driving pulley 42 which is secured on the output shaft of the actual driving motor 43 of the unit 16.

As illustrated in Fig. 4, the motor 43 is fixed to a supporting cradle 44 which is pivoted at 45 on a forked lateral bracket 46 of triangular shape carried by the adjustable bracket plate 33. The cradle 44 is provided with end lugs 47 between which is swiveled one end of a control spindle or stem 48, the opposite end of stem 48 being swiveled at 49 on the bracket 46. Spindle 48 thus affords a means for adjusting the tension of the cone pulley driving belt 41. In order to accommodate vertical movement of the motor output pulley 42 in the adjustment of the other pulley 40, the housing or casing 39 is provided with a vertically elongated side aperture 51. The casing 39 may be supported on the gear housing or box 28 in any suitable way, for example by securement to an adjacent end bearing portion of the same.

In the event work to be operated on is simply required to have a rotary movement imparted thereto, for example a pan-like piece of work W, a chuck 19 of the sort illustrated in Fig. 4A may be keyed on to spindle 15. This chuck is a vacuum controlled one of a well known type. Hence, it need only be noted specially that it is equipped with a vacuum fitting 52 communicated through the hollow interior of a chuck adapter sleeve device 53 (secured on spindle 15) with an aligned center bore of a special vacuum head 54, which is removably secured on an upper portion of the sleeve device. To this end, the vacuum fitting 52 is tapped into a fixed external mounting or housing 55 for the chuck, the sleeve 53 rotating with driven spindle 15 inside housing 55. Appropriate annular seals are interposed between sleeve 53 and housing 55 to hold vacuum in the former. The special vacuum head 54 is contoured to conform with the internal shape of an article of work W, such as a pan to be polished, and is provided on its upper surface with an annular vacuum seal element 54'. This renders vacuum in the interior of head 54 effective to hold the work firmly on the latter until the vacuum is interrupted. Vacuum is intermittently made and broken in the chuck through fitting 52, as controlled by the common control and distributor unit 13.

As indicated above, other functions are contemplated for the spindle 15 other than the rotative drive of a simple chuck 19, which may call for the use of a motive power other than vacuum. An example is illustrated in Figs. 5 and 6, in the form of an oscillatory mechanism 20 involving an auxiliary arm-like housing 56 suitably journalled over the upper end of the spindle bearing sleeve 22 (Fig. 4), with the spindle 15 projecting into the housing 56. In an installation of this sort the sleeve and spindle are retracted downwardly and set as determined by the threaded adjusting rod 35 shown in Fig. 4. A suitable gear train 56' in housing 56 then drivingly connects the spindle 15 with an upright auxiliary spindle 57 journalled in the opposite end of the housing 56 and extending above it.

Specific details of housing 56 and the auxiliary spindle 57, as well as its drive by the gear train, just referred to, constitute no part of the present invention. Similarly, though cam provisions 58 (such as are generally illustrated in dot-dash line in Fig. 6) are associated with the housing 56 to impart a bodily oscillation to the latter as its auxiliary spindle 57 is driven, these provisions are not part of the invention and are not further illustrated or described.

If desired, an auxiliary chuck device, generally designated 59, may be secured on the upper surface of housing 56, to coact with a conventional chuck 19 (vacuum-controlled or otherwise) driven by auxiliary spindle 57. Such auxiliary chuck 59 may, for example, comprise an upright post 60 (Fig. 5A) secured by an appropriate base member to the housing 56, the post 60 having a rigid, laterally offset upper extremity 61 (Fig. 5) equipped with any suitable type of freely rotating auxiliary chuck or cup 62. This cup faces downwardly in axial alignment with spindle 57 and its driven chuck (not shown), to engage the opposite end of the work. Again, specific details of these provisions form no part of the invention.

However, Fig. 5 should be noted in special reference to the contemplated operation of the auxiliary oscillatory work support 20 during the pauses in the indexing cycle of the table 10. As mentioned, the housing 56 is intended to be cam oscillated to effect a desired bodily manipulation of work as it is rotated by auxiliary spindle 57 in engagement with a buffing or like wheel. In order to maintain the work against the wheel, a suitable telescoping type spring mechanism 63 is pivotally connected at 64 on a laterally projecting triangular bracket 65 secured on housng 56. This spring mechanism is shown in Fig. 5, and may consist of a rod 66 biased by an anchored telescoping sleeve type spring unit 67 in a direction to urge the housing 56 in a clockwise direction about the axis of the spindle 15, i.e., towards the peripheral edge E of the indexing work table 10, as viewed in Fig. 5. Spring unit 67 has a universal type swiveled abutment at 67' against a fixed bracket 76, enabling its pivotal action relative to that bracket.

In accordance with the invention, a pneumatic actuating device 68 is associated with the housing 56 of mechanism 20 for the purpose of withdrawing the auxiliary spindle 57 inwardly when the buffing or other operation has been completed. This will permit the work W to clear the buffing or other wheel when the indexing travel of table 10 is resumed.

Unit 68 comprises an air cylinder 69 equipped with an appropriate fitting 70 through which air is supplied to the cylinder under the control of the common control and distributor unit 13 of the apparatus, to be described. A plunger 71 operated by the piston of cylinder 69 has a lost motion pivotal connection to housing bracket 65 by a pin 72 received in an elongated slot 73 of an extension arm 74 on plunger 71. The cylinder 69 and its plunger 71 are appropriately pivoted at 75 on the fixed bracket 76, which also serves as a support for the spring unit 63 by which the housing 56 is biased as described above.

Thus, it is seen that as the housing 56 is cam-oscillated in the fashion referred to, the spring unit 63 opposing the oscillation, the pin 72 will slide to and fro in the slot 73 of the plunger extension 74 of the pneumatic unit 68. However, when it is desired to clear the spindle 57 inwardly at the end of the table indexing pause, so as to pass the buffing wheel as table travel is resumed, compressed air is applied to cylinder 69 through fitting 70. This retracts plunger 71 and its extension 74 against the force of spring unit 63 and swings the arm housing 56 inwardly for the desired purpose.

Reference should be made to Figs. 7, 7A, 8 and 9 for details of one proposed embodiment of the common control and distributor unit 13 generally depicted in Figs. 1 and 2. This unit may, in general, be considered as constituted by three major sections, i.e., a lowermost electrical supply, control and distribution section 80, an intermediate vacuum supply, control and distribution section 81, and an uppermost pneumatic pressure supply and distribution section 82. The section 80 governs the timing of the energization of the individual spindle drive motors 43. These motors are continually driven, either unidirectionally or with periodic reversals, at all times in the table indexing cycle, except when the spindle 15 associated with a given motor is at each of two unloading and loading stations in the path of table travel, or at a combined unloading and loading station.

The intermediate vacuum section 11 controls the making and breaking of a vacuum at the work holding device, such as the vacuum chuck 19 of Fig. 4A.

The upper pneumatic control section 82 governs the operation of an oscillatory arm mechanism like that of Figs. 5 and 6, or some other type of pressure-operated instrumentality having generally similar supply requirements.

It is to be understood that, since the valving devices for the control of fluid pressure are ordinarily applicable interchangeably to the control of negative and positive pressures, when reference is made in this specification and appended claims to the terms "fluid pressure," "fluid pressure control," or the like, the intent is, unless otherwise qualified, comprehensive as to a vacuum or as to a positive pressure. Moreover, it is within the contemplation of the invention that the uppermost pressure section 82 may be physically dismantled from the apparatus, as when a mechanism 20 such as that of Figs. 5 and 6 is not employed. In such case an alternative form of vacuum adapter attachment as shown in Fig. 7A is utilized, as will be described.

In each instance, the supply, control and distribution sections 80, 81, 82 embody fixed and rotative parts which determine the timed supply of electrical current and fluid pressure to their respective controlled mechanisms, in response to the rotation of table 10 on which those mechanisms are borne.

The common control and distributor unit 13, as illustrated in Fig. 7 of the drawings embodies a fixed elongated, upright mounting stem or post 83 which is in part solid and in part hollow in section. It is rigidly supported in any appropriate fashion on the base 11 of the apparatus and extends axially of table 10 and vertically the entire height of the unit 13. At its lower extremity, the post 83 has an upwardly extending central bore 84 through which electrical supply leads (not shown) may be brought and electrically connected respectively to three-wire slip rings 85 of the lowermost electrical supply, control and distribution section 80. These rings are fixedly carried by an appropriate insulating sleeve 86 on the post 83. Thus, a supply of electricity from any standard line is afforded for the electrical energization, unidirectionally or bidirectionally, of the individual spindle drive motors 43 of the driving units 16.

This supply is timed and distributed by cam-controlled switch means connected to the several individual motors 43 in the following way: a primary rotating superstructure 87 is fixedly carried on the top of indexing table 10, coaxially of the latter, which superstructure may comprise a plurality of rigid uprights 88 and a centrally apertured horizontal plate 89 supported thereby at spaced points about its periphery. The aperture of plate 89 receives the fixed post 83, appropriate sealing provisions 90 being carried by the plate in rotative sliding engagement with the post. An insulated brush support 91 is mounted on the upper surface of plate 89, being provided with brushes 92 which engage slip rings 85 in their rotation, as supported by plate 89, superstructure 87 and indexing table 10.

Now referring to Fig. 8 in conjunction with Fig. 7, the rotating part of the electrical section 80 includes a pair of annular switch mounting plates 93, 94 arranged in vertically spaced relation to one another and supported at their outer margins through the agency of the upright members 88. A set of shut-off switches 95, one for each spindle driving unit 16 on table 10, is mounted on the upper plate 93, the angular distribution of the shut-off switches 95 being in accordance with the angular distribution of the mechanisms 16. A further series of reversing switches 96 is carried by the lower plate 94 in radially inwardly spaced and aligned relation to the respective shut-off switches 95.

The switches of both of these sets are of conventional character, each being provided with an operating roller 97 by which the switches 95 are periodically actuated to open, current interrupting position, and by which the reversing switches 96 may be periodically operated as desired to reverse the direction of current flow to the spindle drive motors 43 in accordance with the setting of their cam actuating means now to be described.

The cams means comprise a single master shut-off cam 98 and a series of individual, radially adjustable cams 99, all carried on a support 100 which has a central hub 101 fixed on the stationary post 83. Shut-off cam 98 and the several reversing cams 99 are of the plate type, the cam 98 being of considerably greater arcuate extent than the cams 99. Cam 98 is positioned to face the unloading-loading station or stations traversed by table 10, while reversing cams 99 are distributed angularly in accordance with the spacing of the remainder of the working stations of the machine with which the present indexing apparatus is associated, being in radial register with those stations. A spacer block 102 serves to space the former above the latter, as shown in Fig. 7.

Upon periodic arrival, following a complete rotation of table 10, of a shut-off switch 95 at the unloading-loading station of the apparatus (or at the first of two succeding unloading and loading stations, in some installations), the operating roller 97 of that switch will engage the large, fixed master cam 98 and be actuated, thereby to break an electrical circuit between the switch 95 and the motor 43 of a driving unit 16, to which it is electrically connected by wiring not requiring illustration. Save for this interruption, the motor 43 of each unit 16 is continuously energized during a rotative indexing cycle of the table 10, to operate either unidirectionally or reversely at alternate stations under the control of the reversing switches 96 and their fixed control cams 99. Switches 96 reverse the motors 43 when the cams 99 are in the position shown in Fig. 8.

If alternate reverse driving positions of the units 16 are not desired, all that is necessary is to withdraw the cams 99 radially inwardly out of position to be engaged by the actuating rollers 97 of the reversing switches 96. To this end, each reversing cam 99 is provided with sets of inner and outer openings 103 to optionally receive screws 104 which thus hold cams 99 in relation to their cams, either operative as in Fig. 8 or retracted so as not to be engaged by the rollers 97.

Fig. 9 should be considered in conjunction with Fig. 7 in reference to the intermediate vacuum supply, control and distribution section 81 of unit 13. The operating parts of this unit may be enclosed in a suitable shell 106 which rests on the top of an upper, centrally apertured plate 107 of the superstructure 87. This plate also affords a support for a hollow vacuum distributor or manifold housing 108 surrounding the fixed post 83 of unit 13.

Housing 108 is secured to the plate 107 by suitable screws 109 for rotation with the superstructure 87 and associated parts. A ball bearing assembly 110 between the manifold 108 and post 83 further pilots the rotation of the sections 80, 81 and 82 with indexing table 10.

As illustrated in Fig. 7, the fixed post 83 has a central bore 111 extending downwardly therein adjacent manifold or housing member 108, and this bore is communicated with the interior of the manifold by radial passages 112 drilled in post 83. Appropriate seals 113 are applied to maintain a vacuum in a manifold space 114 to which the passages 112 open. The post bore 111 opens upwardly into an axially aligned imperforate tube 115 mounted in sealed relation thereto, and the upper extremity of this tube is adapted to receive a suitable connector leading to an appropriate source of vacuum.

Exhaust manifold or housing 108 is radially drilled to receive a plurality of circumferentially spaced, nipple-like connectors 116, each leading to a vacuum valve 117 of a commercially available type, there being a valve for each of the work chucks 19 (Fig. 4A) driven by spindles 15, or for each of equivalent pressure controlled instrumentalities.

The type of valve chosen for illustration is equipped with an actuating cam follower roller 118 extending above the same in rolling engagement, as transported in the indexing movement of the table 10, with a fixed plate-like cam 119 carried by upright post 83. As illustrated in Fig. 9, the lower surface of cam 119 to be engaged by follower rollers 118 is interrupted or other wise formed so as to release its valve 117 and interrupt vacuum at an unloading and/or loading station in the path of table travel, at which energization of the motorized units 16 is also interrupted.

This may be accomplished by providing an inclined surface 120 on plate cam 119 leading to a notch-like interruption 121 therein, at which the valve automatically closes, opening of the valve to establish the vacuum taking place when its roller 118 resumes rolling engagement with the cam. In the event the apparatus has a single or common unloading and loading station, as distinguished from separate successively arranged stations at which unloading and loading operations are performed without vacuum, the interruption 121 may be partially filled in by the application of a special removable closure segment 122. This expedient may also be resorted to if the table has a loading station at which an existing vacuum is required and which follows a de-vacuumed unloading station.

In regard to the upper pneumatic pressure supply and distribution section 82 of apparatus 13, it may comprise an auxiliary superstructure 124 releasably supported on the top plate 107 of the main superstructure 87 by suitable bolts 125, enabling removal of the entire section 82, if desired. A pressure manifold 126 is supported by the structure 124, having an internal annular cavity 129 surrounding a sleeve bearing 130, which bearing slidably engages a pressure supply tube 131 surrounding the vacuum tube 115. The tube 131 and bearing 130 are radially apertured to periodically communicate manifold cavity 129 with air pressure in tube 131, this pressure being supplied through an appropriate fitting 132 surrounding vacuum tube 115 and fixedly secured to the upper end of the latter, with a seal 133 applied to prevent leakage. Fitting 132 will lead to any appropriate air pressure source.

As indicated above, it may be desirable to dispense entirely with the air pressure section 82 of the common control 13. If so, the manifold 126, pressure tube 131, and vacuum tube 115, along with associated fittings, are removed upon removal of the auxiliary superstructure 124 as described. A simple tubular adapter fitting 134 of the type illustrated in Fig. 7A is then applied directly to the hollow upper end of fixed post 83, in sealed communication with the downwardly extending vacuum bore 111 in the stem. Adapter fitting 134 is then connected by a flexible tube or the like to a source of vacuum.

Alternative embodiments of electrical and fluid pressure supply, control and distribution provisions of sections 80, 81 and 82 of the control unit 13 of the apparatus are illustrated in Figs. 10 through 15. They are considerably more compact, simple and inexpensive in regard to structure than the previously described embodiment of Figs. 7–9, and for that reason are considered to represent the preferred form of the invention in respect to these two units. The electrical supply, control and distribution section is best illustrated in Figs. 10 and 11, being generally designated by the reference numeral 140, while features of the fluid pressure supply, control and distribution section, generally designated 141, appear in Figs. 12–15.

Referring first to Figs. 10 and 11, a fixed slip ring supporting post or stem 142 is rigidly mounted in an appropriate way on the frame work 11 of the apparatus, and this stem carries a fixed cam mounting plate 143 spaced somewhat above the surface of the indexing table 10. A master switch operating cam 144 and a number of switch reversing cams 145 are fixedly mounted on plate 143, in the manner described in connection with the corresponding cams 98, 99 of the first embodiment, including provisions for radially withdrawing the reversing cams 145 to inoperative position when desired. These cams control the operation of shut-off switches 146 and reversing switches 147 for each motor drive unit 16, in the same way the shut-off switches 95 and reversing switches 96 of the first form are controlled. The switches 146, 147 are of course electrically connected to the respective driving motors 43 in a conventional fashion.

Upwardly of cam supporting plate 143 the fixed post 142 has slip rings 148 mounted thereon by an insulating sleeve 149, and a brush unit generally designated 150 coacts with the slip rings in the manner described above. However, a simplification of the electrical distribution structure is effected by bringing the electrical leads to the slip rings 148 upwardly through a central bore 151 in fixed post 142, thence outwardly through an angled passage 152 to the respective rings 148.

The electrical brush unit 150 is carried on a central superstructure 154 of the electrical supply, control and distribution section 140, being secured on a horizontal plate 155, welded or otherwise connected to this superstructure. Similarly, the switches 146 and 147 are fixedly secured on a lower horizontal plate 156 of the superstructure 154, which plate is fixed by bolts 157 on the upper surface of the indexing table 10.

Fig. 10 generally indicates the position of the fluid pressure supply, control and distribution section 141 in relation to the electrical section 140; and reference should be made to Figs. 12, 13, 14 and 15 for details of this simplified unit.

It comprises a flanged distributor housing base member 160 which is secured by bolts 161 on the upper surface of an annular top plate 162 of the superstructure 154. Base member 160 of course rotates with the superstructure 154, and is piloted on a fixed, internally bored supply cylinder 163 of substantial diameter, which is slipped onto the upper extremity of fixed post 142 and held against rotation thereon by a spline 164. The supply cylinder 163 is somewhat elongated in the axial direction, in effect constituting an upper extension of the fixed post 142.

An upper distributor housing or casing 165 is bolted onto the top of base member 160, in sealed relation thereto; and appropriate sleeve type bearings 166 are interposed between the thus constituted distributor housing structure and the post or fixed supply cylinder 163, at the top and bottom thereof, to provide an anti-friction pilot for the rotative distributor structure on the fixed post of the apparatus.

As illustrated in Fig. 12, the supply cylinder 163 is provided with axially extending bores 167, 168 and 169 of differing diameter which extend different axial distances in the cylinder 163. The largest bore 167 is a vacuum bore which opens upwardly through the top of cylinder 163 and is adapted to be connected at this point with a suitable source of vacuum. The bore 168 of intermediate size has its bottom terminating above that of the bore 167; it also opens through the top of cylinder 163 and is there adapted to be connected to a suitable source of compressed air. The smallest bore 169 extends downwardly beyond the lower end of vacuum bore 167 and opens at its top to atmosphere. This bore 169 is for the purpose of breaking the vacuum in a work holder, such as the chuck 19 of Fig. 4A, when the vacuum connection of the latter through bore 167 has been interrupted.

A radial passage 170 in supply cylinder 163 communicates the lower end of vacuum bore 167 with an annular vacuum manifold 171 defined between the distributor housing 165 and the outer surface of the cylinder. Another radical passage 172 (Fig. 14) in cylinder 163 communicates the lower end of compressed air bore 168 with a pressure manifold 173 between housing 165 and cylinder 163 at a more elevated point. Appropriate annular seals 174 separate the manifolds 171, 173 from one another.

As illustrated in Figs. 13 and 15, the smallest bore 169, which is adapted to be communicated with atmosphere or, if desired, to a positive pressure source, is provided at its bottom with a lateral passage 175 which receives a tubular connector element 176. The element is spring biased outwardly and extends outwardly of fixed post 163 into a lower enlargement 171' of annular vacuum manifold 171, where it is provided with a hollow manifold member 177. Member 177 has its outer surface shaped in conformity with the cylindrical outer wall of manifold enlargement 171', and is thus in sealed sliding engagement with the latter. Appropriate O-ring seals 178 are applied between tubular connector element 176 and both the cylinder post 163 and manifold member 177 to prevent fluid pressure leakage.

As illustrated in Fig. 15, the rotative distributor housing 165 is provided with a plurality of radially opening ports or passages 179 leading from the manifold enlargement 171' to the exterior of the housing; and the arcuate extent of the atmosphere or pressure manifold member 171 is sufficient to bridge the inner end of two successive ports 179 opening to this manifold enlargement. Suitable tubing will connect ports 179 to the work holders 19. Thus the manifold cavity 180 within the member 177 will break the vacuum on work holders 19 of two successive spindles 15 as they reach the unloading and loading stations of the apparatus. At all other times, the work holders are subject to vacuum communicated therewith through the ports 179 and vacuum manifold 171 proper.

The wall of distributor housing 165 is provided at a more elevated zone with a plurality of air pressure ports 181 distributed equally about its circumference, which ports 181 are adapted to communicate the pressure manifold 173 through suitable piping or tubing with devices such as the pneumatically controlled auxiliary arm unit 20 of Figs. 5 and 6.

In the operation of the apparatus described, the table is indexed successively past operating instrumentalities such as buffing wheels or the like, the work W to be operated on being supported by chucks 19 keyed on the respective rotatively driven spindles 15, or in an alternative installation by similar work holders applied to the gear driven spindles 57 of an auxiliary mechanism 20. The spindles are driven at suitable speed by the individual electrically powered driving units 16, and the rate of rotation may be varied as desired over a wide range by appropriate adjustment of the variable speed power transmission unit 17 associated with each motor 43. Similarly, the vertical position of the spindles may be regulated by vertical adjustment of the entire assembly 14 including the motor unit 16 and the spindle, employing the adjustable stem 35 for this purpose.

Current is supplied to the motors 43 of the units 16 from a slip ring and brush unit, illustrated as regards its positional mounting in one form in Fig. 7 and in another form in Fig. 10; and the current is interrupted to stop the respective motors 43 when their driven spindle 15 reaches an unloading and/or unloading-loading station by means of shut-off switches 95 and master cam 98 (Figs. 7 and 8), or like shut-off switches and master cam 144 (Figs. 10 and 11). If reversal of the motor drive is in order at successive other stations, the respective reversing cams and switches 99, 96 (Figs. 7 and 8) or the corresponding cams 145 and switches 147 of Figs. 10 and 11 perform this operation. Otherwise, the cams 99 and 145 are retracted radially out of operating position, as described, and rotation of the spindles is unidirectional about their axes.

Upon arrival at the unloading and loading point, the vacuum theretofore effective on the work holders is interrupted to permit removal of a finished article from its holder and placement of another article to be operated on. In the embodiment shown in Figs. 7 and 9, this is effected by the valves 117 operating under the control of fixed plate cam 119, with an arrangement including the masking cam member 122 (Fig. 9) available in the event it is desired to diminish the size of the cam interruption 121. Valve 117 breaks the vacuum effective on the work holder 19 only upon arrival at interruption 121. In the embodiment shown in Figs. 13 and 15, the vacuum on the work holder is continuously maintained through vacuum manifold 171 and its enlargement 171' until the unload-load station or zone is reached, at which time the vacuum is broken through the hollow, spring biased manifold member 177 and atmosphere bore 169.

As for the control of air pressure supplied in the form of Fig. 7 through fitting 132, tube 131 and rotating manifold 128, or in the form of Figs. 12, 13 and 14 through bore 168, passage 172, manifold 173 and ports 181, this may be effected in any desired manner, as will be apparent to those skilled in the art. Periodic positive pressure control may, indeed, be accomplished by means practically the same as the provisions to control vacuum such as are illustrated herein.

In an actual installation, appropriate valving provisions have been located on the apparatus beneath the rotative control superstructure, being periodically operated in the indicated manner to apply timed pressure through a tube 131, manifold 126 and appropriate tubing (Fig. 7), or through a cylinder bore 168, passage 172, manifold 173 and tubing (Figs. 13, 14) to each compressed air cylinder 69 (Fig. 5) just before the table 10 commences its indexing movement.

The improved indexing work supporting apparatus is of extreme versatility in respect to the variety of work holding and driving installations which it will handle. Individual motor drives for each spindle 15 (or auxiliary spindle 57) and the wide adjustability as to operating speeds make it possible to adapt the apparatus to operations on a great many types of work. It can be offered to the trade in a considerable range of physical sizes, and it is evident that the number of independently driven spindles on the indexing table 10 of any given size may also be increased or diminished as desired over a substantial range.

A common control and distribution unit for electrical and fluid power makes it possible to service the apparatus, as in change over from one job to another, with ease and speed, and lends simplicity and compactness to the apparatus as a whole. Practically no supervision in operation is required, and an operator who attends to the loading and unloading of articles has ample opportunity to render any attention which may be required from time to time. Articles of the most intricate contour may be successfully polished by employing work holders of appropriate design and operation, as instanced by the auxiliary unit of Figs. 5 and 6. Furthermore, these operations may be performed at high speed, insuring an increased output rate for any operation to which the apparatus is applied, as compared with existing apparatus for the same purpose.

The drawings and the foregoing specification constitute a description of the improved rotary work supporting and indexing apparatus in such full, clear, concise and exact terms as to enable any person skilled in the art to practice the invention, the scope of which is indicated by the appended claims.

What I claim as my invention is:

1. A work forwarding mechanism comprising a rotatable work support having a plurality of individually rotative spindles supported thereon in spaced relation about the same, each spindle being adapted to mount a fluid pressure controlled holder for an article to be worked on, an individual driving unit for each spindle, and a control unit rotatable coaxially with said traveling support, said control unit being provided with periodically actuatable fluid pressure control means adapted to time the distribution of an operating fluid to said work holders and with further control means to effect the periodic actuation of said spindle driving units, and means operating upon rotation of said control unit to govern the operation of said respective control means.

2. A work forwarding mechanism comprising a rotatable work support having a plurality of individually rotative spindles supported thereon in spaced relation about the same, each spindle being adapted to mount a fluid pressure controlled holder for an article to be worked on, an individual driving unit for each spindle, comprising an electric motor and a variable speed reduction device drivingly connecting the motor to its spindle, and a control unit rotatable coaxially with said traveling support, said control unit being provided with periodically actuatable fluid pressure control means adapted to time the distribution of an operating fluid to said work holders and with further control means to effect the periodic energization of said motors, and means operating upon rotation of said control unit to govern the operation of said respective control means.

3. A work forwarding mechanism comprising a rotatable work support having a plurality of individually rotative spindles supported thereon in spaced relation about the same, each spindle being adapted to mount a fluid pressure controlled holder for an article to be worked on, an individual driving unit for each spindle, comprising an electric motor and a variable speed reduction device drivingly connecting the motor to its spindle, means supporting each spindle and its driving unit for adjustment transversely of the plane of travel of said work support, and a control unit rotatable coaxially with said traveling support, said control unit being provided with a periodically actuatable fluid pressure control means adapted to time the distribution of an operating fluid to said work holders and with further control means to effect the periodic energization of said motors, and means operating upon rotation of said control unit to govern the operation of said respective control means.

4. A work forwarding mechanism comprising a rotatable work support having a plurality of individually rotative spindles supported thereon in spaced relation about the same, each spindle being adapted to mount and rotatively drive a fluid pressure controlled holder for an article to be worked on, as well as to receive a further fluid pressure actuated article control device, an individual driving unit for each spindle, and a control unit rotatable coaxially with said traveling support, said control unit being provided with periodically actuatable fluid pressure control means adapted to distribute an operating fluid to said work holders at timed intervals, distributing means for fluid pressure to actuate said further control devices, and power distributing means to control the periodic operation of said individual driving units, and means operating upon rotation of said control unit to actuate said fluid pressure and power distributing means and thereby periodically modify the operation of said work holders and driving units.

5. A work forwarding mechanism comprising a rotatable work support having a plurality of individually rotative spindles supported thereon in spaced relation about the same, each spindle being adapted to mount and rotatively drive a fluid pressure controlled holder for an article to be worked on, as well as to receive a further fluid pressure actuatable article control device, an individual driving unit for each spindle comprising an electric motor drivingly connected to its spindle, and a control unit rotatable coaxially with said traveling support, said control unit being provided with periodically actuatable fluid pressure control means adapted to distribute an operating fluid to said work holders at timed intervals, distributing means for fluid pressure to actuate said further control devices, and electric power distributing means to control the periodic operation of said motors, and means operating upon rotation of said control unit to actuate said fluid pressure and power distributing means and thereby periodically modify the operation of said work holders and motors.

6. A work forwarding mechanism comprising a horizontally rotatable work support having a plurality of upright, individually rotative work holding spindles supported vertically thereon in spaced relation about the same for rotation on axes paralleling the axis of rotation of said support, an individual driving unit for each spindle, comprising an electric motor drivingly connected to the spindle, means adjustably suspending each spindle and its driving unit from said support to enable vertical adjustment of said spindle and unit on said work support, and a control unit rotatable with said support, said control unit being provided with electric power distributing means to control timed operation of said motors, and means operating upon rotation of said control unit to periodically operate said power distributing means.

7. A work forwarding mechanism comprising a horizontal, rotatable work support having a plurality of upright, individually rotative work spindles supported thereon in spaced relation about the same and each adapted to mount a fluid pressure controlled holder for an article to be worked on, an individual driving unit for each spindle, comprising an electric motor drivingly connected to the spindle, means adjustably suspending each spindle and its driving unit from said support to enable vertical adjustment of said spindle and unit on said work support, and a control unit rotatable coaxially with said support, said control unit being provided with fluid pressure means to timedly distribute operating fluid to said work holders and electric power distributing means to control timed operation of said motors, and means operating upon rotation of said control unit to periodically operate said fluid pressure and power distributing means.

8. A work support mechanism for a buffing or like operation periodically performed on work conveyed by said support, comprising a horizontal, rotatable support structure having a plurality of work supporting devices spaced about the same, each device including an upright rotary spindle and an electric motor connected to operate the spindle through a variable speed drive connection, said spindles being adapted optionally to mount for rotation work holder devices of various types which are operated and/or controlled by fluid pressure, and a control unit to govern the supplying of electricity to said motors and fluid pressure for said work holders, comprising electrical supply connections to said motors including a plurality of switches rotating with said support structure, a fluid pressure manifold rotatable with said support structure and having means to communicate the same with a source of control pressure, passages to communicate said manifold with said respective work holder devices, and valve means controlled by the rotation of said work support to periodically cut off communication of each of said passages with said manifold.

9. A work support mechanism for a buffing or like operation periodically performed on work conveyed by said support, comprising a horizontal rotatable support structure having a plurality of work supporting devices spaced about the same, each device including an upright rotary spindle and an electric motor connected to operate the spindle through a variable speed drive connection, said spindles being adapted optionally to mount for rotation work holder devices of various types which are operated and/or controlled by fluid pressure, and a control unit to govern the supplying of electricity to said motors and fluid pressure for said work holders, comprising electrical supply connections to said motors including a plurality of switches rotating with said support structure, cam means controlling the switches in response to rotation of said work support to periodically break said respective supply connections, said valve and cam means operating substantially simultaneously at an unloading station in the path of travel of the support structure.

10. A mechanism in accordance with claim 9, in which said work holder devices are vacuum chucks and said manifold is a vacuum manifold, and in which said valve means comprises a plurality of vacuum valves connected to said respective passages and adapted to be communicated with a source of vacuum, and a cam engaged by said valves in the rotation of said work to periodically operate the valves.

11. A mechanism in accordance with claim 9, in which said work holder devices are vacuum chucks and said manifold is a vacuum manifold, and in which said valve means comprises a hollow conduit element in said vacuum manifold in communication with a higher pressure, said element slidingly engaging said vacuum manifold in the rotation thereof to periodically interrupt the application of vacuum in the latter to said passages and to apply said higher pressure thereto.

12. A control mechanism comprising an indexing structure rotatable about a fixed upright stem as an axis, a slip ring secured to said stem, fluid pressure passages within said stem, a plurality of switches rotatable with said structure and each supplied electrically by said slip ring, a cam controlling opening and closing of said switches in the rotation thereof with said structure, fluid pressure manifold means carried by said rotatable indexing structure in communication with said fluid pressure passage in said stem, and valving connected to said manifold means and periodically operable coordinately with said switches at a predetermined zone in the rotation of said structure.

13. A control mechanism comprising an indexing structure rotatable about a fixed upright stem as an axixs, a slip ring secured to said stem, vacuum and positive fluid pressure passages within said stem, brushes carried by said rotatable indexing structure in engagement with said slip ring, a plurality of switches rotatable with said structure and each supplied electrically by a brush engaging said slip ring, a cam on said stem controlling opening and closing of said switches in the rotation thereof with said structure, vacuum and positive fluid pressure manifold means carried by said rotatable indexing structure in communication with said passage and vacuum-fluid pressure passages in said stem, and valving connected to said manifold means and periodically operable coordinately with said switches at a predetermined zone in the rotation of said structure.

14. A control mechanism comprising a structure rotatable intermittently about a fixed upright spindle as an axis, a slip ring secured to said spindle, brushes carried by said rotatable structure in engagement with said slip ring, a plurality of switches rotatable with said structure and each supplied electrically by a brush, a cam on said spindle controlling opening and closing of said switches in the rotation thereof with said structure, a vacuum passage within said spindle adapted to be connetced respectively to a vacuum source, a vacuum manifold carried by said rotatable structure in communication with said vacuum passage of said spindle, and valve means connected to said manifold and controlled in response to the rotation of said structure to operate simultaneously with the respective switches at a predetermined zone in the rotation of said structure.

15. In combination with a rotatable work table provided with a series of work spindles, an oscillatory work supporting unit comprising an arm-like member adapted to be periodically oscillated about a spindle as an axis in a rotative cycle of movement of said table, an auxiliary work member carried by said oscillatory member in offset relation to said axis, and means to periodically impart a further swing to said oscillatory member about said axis during a pause in the rotative cycle of said table, other than said periodic oscillation.

16. In combination with a rotatable work table provided with a series of work spindles, an oscillatory work supporting unit comprising an arm-like member adapted to be periodically oscillated about a spindle as an axis in a rotative cycle of movement of said table, an auxiliary work member carried by said oscillatory member in offset relation to said axis, and means to periodically impart a further swing to said oscillatory member about said axis during a pause in the rotative cycle of said table, other than said periodic oscillation, comprising a fluid pressure actuated cylinder operatively connected to said oscillatory member and automtically controlled periodically to swing the latter as described.

17. In combination with a rotatable indexing work table provided with a series of rotatively driven work spindles, an oscillatory work supporting unit comprising an arm-like member housing adapted to be periodically oscillated about a spindle as an axis in a rotative cycle of movement of said table, an auxiliary driven work member carried by said oscillatory member in offset relation to said axis, power transmitting means in said oscillatory housing member to drive said auxiliary work member from said spindle, and means to periodically impart a further swing to said oscillatory member about said axis during a pause in the rotative cycle of said table, other than said periodic oscillation.

18. In combination with a rotatable indexing work table provided with a series of rotatively driven work spindles, an oscillatory work supporting unit comprising an arm-like housing member adapted to tbe periodically oscillated about a spindle as an axis in a rotative cycle of movement of said table, an auxiliary driven work member carried by said oscillatory member in offset relation to said axis, power transmitting means in said oscillatory housing member to drive said auxiliary work member from said spindle, and means to periodically impart a further swing to said oscillatory member about said axis during a pause in the rotative cycle of said table, other than said periodic oscillation, comprising a fluid pressure actuated cylinder operatively connected to said oscillatory member and automatically controlled periodically to swing the latter as described.

19. A work forwarding mechanism comprising a work support having means to rotate the same and being provided with a plurality of individually rotative spindles in spaced relation about the same, each spindle being adapted to mount a holder for an article to be worked on and having means mounting the same on said support for 360° rotation, an individual driving motor for each spindle having means to drivingly connect it to the spindle for continuous rotation of the latter upon operation of said motor, and control means to effect the periodic operation of said motors and rotation of said spindles about their axes in the rotation of said support.

20. A work forwarding mechanism comprising a work support having means to rotate the same about a vertical axis and being provided with a plurality of individually rotative spindles in spaced relation about the same, each spindle being adapted to mount a holder for an article to be worked on and having means mounting the same on said support for 360° rotation on a vertical axis, an individual electrical driving motor for each spindle having means to drivingly connect it to the spindle for continuous rotation of the latter upon operation of said motor, and control means to effect the periodic operation of said motors and rotation of said spindles about their axes in the rotation of said support, comprising a switch for each spindle electrically connected to the driving motor thereof, a source of electrical power connected to said switches, and switch operating means to periodically open and close a switch for each motor in the rotation of said support.

21. A work forwarding mechanism comprising a work support having means to rotate the same about a vertical axis and being provided with a plurality of individually rotative spindles in spaced relation about the same, each spindle being adapted to mount a holder for an article to be worked on and having means mounting the same on said support for 360° rotation on a vertical axis, an individual electrical driving motor for each spindle having means to drivingly connect it to the spindle for continuous rotation of the latter upon operation of said motor, and control means to effect the periodic operation of said motors and rotation of said spindles about their axes in the rotation of said support, comprising a pair of switches for each spindle electrically connected to the driving motor thereof, a source of electrical power connected to said switches, and switch operating means to periodically open and close a switch for each motor in the rotation of said support, said switch operating means including means to selectively operate the switches of said pairs for the reversible rotation of said spindles.

22. A work forwarding mechanism comprising a work support having means to rotate the same about a vertical axis and being provided with a plvrality of individually rotative spindles in spaced relation about the same, each spindle being adapted to mount a holder for an article to be worked on and having means mounting the same on said support for 360° rotation on a vertical axis, an individual electrical driving motor for each spindle having means to drivingly connect it to the spindle for continuous rotation of the latter upon operation of said motor, control means to effect the periodic operation of said motors and rotation of said spindles about their axes in the rotation of said support, comprising a switch for each spindle electrically connected to the driving motor thereof, a source of electrical power connected to said switches, and switch operating means to periodically open and close a switch for each motor in the rotation of said support, and an arm-like adapter unit mounted upon at least one of said spindles, said adapter unit having a vertical spindle member rotatable on an axis in laterally spaced relation to that of the spindle, which spindle member is adapted to receive a holder for an article to be worked on, and means drivingly connecting said spindle member with said spindle for 360° rotation of said member about its own axis.

23. A work forwarding mechanism comprising a work support having means to rotate the same about a vertical axis and being provided with a plurality of individually rotative spindles in spaced relation about the same, each spindle being adapted to mount a holder for an article to be worked on and having means mounting the same on said support for 360° rotation on a vertical axis, an individual electrical driving motor for each spindle having means to drivingly connect it to the spindle for continuous rotation of the latter upon operation of said motor, control means to effect the periodic operation of said motors and rotation of said spindles about their axes in the rotation of said support, comprising a pair of switches for each spindle electrically connected to the driving motor thereof, a source of electrical power connected to said switches, and switch operating means to periodically open and close a switch for each motor in the rotation of said support, said switch operating means including means to selectively operate the switches of said pairs for the reversible rotation of said spindles, and an arm-like adapter unit mounted upon at least one of said spindles, said adapter unit having a vertical spindle member rotatable on an axis in laterally spaced relation to that of the spindle, which spindle member is adapted to receive a holder for an article to be worked on, and means drivingly connecting said spindle member with said spindle for 360° rotation of said member about its own axis.

References Cited in the file of this patent

UNITED STATES PATENTS

| | | |
|---|---|---|
| 1,319,921 | Bock | Oct. 28, 1919 |
| 1,750,433 | Rosche | Mar. 11, 1930 |
| 2,060,293 | Ferris | Nov. 10, 1936 |
| 2,103,351 | Eckardt | Dec. 28, 1937 |
| 2,243,410 | Balsiger | May 27, 1941 |
| 2,416,121 | Schreiber | Feb. 18, 1947 |
| 2,568,667 | Staples | Sept. 18, 1951 |